United States Patent Office 3,086,876
Patented Apr. 23, 1963

3,086,876
REFRACTORY COMPOSITION AND PROCESS OF MAKING SAME
John Oliver Griggs, Olympia Fields, and William L. Ross, Chicago, Ill., and Alan R. Fraser, Michigan City, Ind., assignors to Carb-Rite Co., Chicago Heights, Ill., a corporation of Illinois
No Drawing. Filed Dec. 5, 1960, Ser. No. 73,534
12 Claims. (Cl. 106—61)

The present invention relates to an exothermic refractory composition and is a continuation-in-part of our previously filed application Serial No. 2,836, filed January 18, 1960, which application was a continuation-in-part of application Serial No. 770,606, filed October 30, 1958, both now abandoned, and more particularly, relates to such composition which is useful in repairing basic-lined steel-making furnaces such as open-hearths, Bessemer converters, and the like. Our invention also relates to the process of producing the instant refractory composition.

It is well known by those skilled in the steel-making art that repair of an open-hearth furnace lining as now generally practiced presents a time-consuming, expensive problem, particularly since in all presently-employed techniques a comparatively long "down-time," in the order of several hours, is required. In the operation of an open-hearth furnace, for example, after each few melts (i.e., the operation from loading the furnace to tapping the molten material therefrom), it becomes necessary to repair holes which are formed in either the furnace bottom or the side walls thereof. With all presently known materials such repairs are made while the furnace is uncharged, and it has been necessary that the repair patch be completely solidified in place before the next charge is loaded. In distinction to the usual repair mixes of the prior art, the present invention is directed to an exothermic refractory mix which reduces furnace repair to a matter of only a few minutes with the consequent reduction of down-time to result in considerable economic advantage.

In order to better understand our invention, reference should first be briefly had to the construction of the linings in open-hearth furnaces. Such linings are of a basic refractory nature ranging in thickness from several feet on the furnace bottom to one foot or more on the side walls and form the immediate container for the molten metal and slag. Such lining must remain solid during the operation of the furnace to not only contain the charge, but likewise to provide a heat-insulation effect for the various other furnace structural members and the furnace environment. During operation the lining is subjected to rather severe thermal and mechanical shocks which result in varying degrees of erosion thereof to produce cracks, holes, etc. In the past, because of the expense, due to non-productive time primarily, the practice has been to neglect repairing the minor cracks and holes as they immediately form and to wait until a rather substantial hole has developed which must be repaired or even more serious damage will result to the furnace. By the use of the present patching mix it now becomes economically feasible to repair such minor damage in its initial stage as a preventative maintenance procedure before such cracks or openings become so large that major repairs are necessary, in addition to its usefulness in the repair of major deteriorational effects.

In view of the foregoing discussion a primary object of our invention is to provide an exothermic refractory mixture which is useful for the rapid repair of furnace lining materials.

Another object of our invention is to provide an exothermic refractory patching material which may be applied in toto immediately after a furnace is tapped and cleaned and which ignites at the temperature of the furnace bottom to fuse in place to thus permit re-use of the furnace within a brief time.

Another and further object of our invention is the provision of an exothermic mixture which because of market conditions, freight rates, and the like, may be prepared at a predetermined location and shipped to various points for mixture with a base material such as dolomite or magnesite in finely divided form and in the proportions and manner of mixing as set forth herein to be used on location or prepared for use on location where the supply of base materials such as magnesite or dolomite may be procured from adjacent localities where the mixture is to be used, whereas, the shipment of the entire mix, including the base material such as magnesite or dolomite, because of freight rates or the like might be prohibitive because of cost.

Other objects, features and advantages of our invention will become apparent to those skilled in this particular art from the following detailed disclosure thereof.

We have developed an exothermic refractory patching material which consists essentially of a blended mixture of a finely-ground exothermic submixture such as aluminum and magnetite and a fluxing halide material such as sodium, potassium or calcium chloride or sodium, potassium or calcium fluoride in which crushed magnesite and/or crushed magnesite and dolomite is added as a body-producing material. The submixture provides the exothermic feature of the present composition, whereas the magnesite, crushed to a −10 mesh particle size, or the combination of a mixture of magnesite and dolomite, provides the main ceramic structural body, it of course being understood that the submixture, after reaction, provides a portion of such repair structure.

EXOTHERMIC SUBMIXTURES

Table I

| Material | Particle Mesh Size | Percent Weight |
|---|---|---|
| Aluminum | −100 | 6–20. |
| Iron oxide ($Fe_3O_4$, $Fe_2O_3$) | −200 | 18–40. |
| Calcium fluoride | −100 | .25–9. |
| Dolomite (Calcined) | −20 | 30–75. |
| Silicon | −100 | 3% if desired. |

All percentages are by weight, and of a particle size at least as small as designated.

An example of specific exothermic submixture may be compounded within the limits of the following table:

Table II

| Material | Particle Mesh Size | Percent Weight |
|---|---|---|
| Aluminum | −100 | 12 |
| Iron oxide ($Fe_3O_4$, $Fe_2O_3$) | −200 | 33 |
| $CaF_2$ (fluorspar) | −100 | 5 |
| Dolomite (Calcined) | −20 | 49 |
| Silicon | −100 | ¹ 0–3 |

¹ 3% silicon may be used if the refractory patch material as a whole contains less than 3% silica.

This submixture is somewhat similar to Table I except that the percentages of the material are specific, although not critical, with slight variations permitted with respect to all of the materials.

We find only a high level iron oxide is suitable to produce the desired results in the exothermic mixture as set forth in all of the tables and that an iron oxide of type $Fe_2O_3$ will perform in this combination, but iron oxide of the type $Fe_3O_4$ is the more desirable form of oxide for use in the combinations given and will produce much more satisfactory results.

The calcium fluoride is one of the flux materials used and dolomite is the other. Sodium, potassium, calcium chloride or sodium or potassium fluoride may be used with equal success as calcium fluoride, all of these materials being of the family of halides, and are mixed in the same proportions, grain size, and manner as is the calcium fluoride in the combination of materials.

The complete refractory material is formed by the blending together of the exothermic material with crushed magnesite and/or crushed magnesite and dolomite of quantities generally and particle size as given in the following table:

Table III

| | [3] Percent |
|---|---|
| Aluminum powder, —100 mesh or smaller | 2–8 |
| Iron oxide, —200 mesh ($Fe_3O_4$, $Fe_2O_3$) | 6–15 |
| Calcium fluoride, —100 mesh or smaller | 0.5–3 |
| Dolomite [1] (calcined) | 15–60 |
| Magnesite [2] (calcined) | 30–70 |
| Silicon (optional) | 0–1 |

[1] Of —20 mesh particle size with the further proviso that at least 60% be particles fine enough to pass through a —100 mesh screen.
[2] All particles must be capable of passage through a —10 mesh screen.
[3] All percentages are by weight.

An example of a complete refractory repair material specific as to quantity and particle size mixed as hereinafter described would be the addition of two parts crushed magnesite to one part of the exothermic mixture of Table II which would produce a mixture as follows:

Table IV

| | [1] Percent |
|---|---|
| Aluminum powder | 4.13 |
| Iron oxide ($Fe_3O_4$, $Fe_2O_3$) | 11.00 |
| Calcium fluoride | 1.67 |
| Dolomite (calcined) | 16.60 |
| Magnesite (calcined) | 66.60 |

[1] Again, in terms of weight percentages, and of the particle size specified in Table III.

Another suitable complete mixture and of a somewhat lower cost, would be a mixture as set forth in Table IV to which an equal part of dolomite is added which results in a complete mixture as follows:

Table V

| | [1] Percent |
|---|---|
| Aluminum powder | 2.065 |
| Iron oxide ($Fe_3O_4$, $Fe_2O_3$) | 5.50 |
| Calcium fluoride | .835 |
| Dolomite (calcined) | 58.30 |
| Magnesite (calcined) | 33.30 |

[1] Again, in terms of weight percentages, and of the particle size specified in Table III.

In preparing the foregoing mixtures we prefer to first form the submixture by mixing the aluminum powder with the iron oxide thereby thoroughly coating the aluminum particles with the iron oxide and thereafter progressively adding the calcium fluoride and calcined dolomite in this order. Following this, the magnesite is blended with the submixture to form the instant exothermic repair mix. If preferred, additional dolomite may be added to the exothermic mixture and then the required magnesite may be added to the mixture thus formed. As an alternative, the required quantity of dolomite and magnesite may be pre-mixed and this mixture blended into the exothermic mixture to form a completed product.

In the blending operation it is preferred that the apparatus used will produce a tumbling action of the material and that its abrasiveness upon the mixture be held to a minimum for it is extremely desirable that the mixture be well-blended and the particles thereof be in intimate contact to assure complete chemical reaction; on the other hand, the particle sizes should be as little disrupted as possible. While we prefer to progressively mix the materials as outlined hereinabove, a proper mix can be produced by simultaneously mixing together the materials listed in the tables in the proportions specified and of the particle size specified in Table II to secure a workable mixture. If desired, however, instead of simultaneously mixing all the ingredients together, the proper proportionate quantities of aluminum powder and iron oxide can first be mixed together in a tumbling machine so that the particles of aluminum powder are quite thoroughly coated with the particles of iron oxide, and the mixtures thus obtained blended with the balance of the materials comprising the composition, provided, this mixing is not too violent and it is not conducted for too long a time so as to remove the iron oxide particles from the aluminum particles, although, in the quantities given there will be a considerable quantity of iron oxide remaining to be distributed throughout the mass of material forming the total mix.

The instant mixture is utilized in the dry state and may either be directly applied into the hole to be repaired or first bagged in conveniently combustible containers which are then deposited in the repair site. Such repair may be commenced immediately after the furnace has been tapped and cleaned, i.e., while it is still hot and within a few minutes after such application the repaired furnace is again ready for use.

The materials comprising the present refractory repair composition have been carefully selected with their chemical and physical characteristics in mind. For example, aluminum is a reducing agent and iron oxide is an oxidant, and by their combination in the foregoing percentages, by first mixing the aluminum with the iron oxide there results a complete coating of the aluminum particles by the iron oxide along with a considerable surplus of oxidizing iron oxide. We prefer to use —100 mesh aluminum particles in order to provide a relatively large surface area for oxidation which in turn permits a uniform exothermic reaction. Iron oxide ($Fe_3O_4$) is the preferred oxide for use herewith because of its oxidizing efficiency and the ease with which it adheres to the aluminum particles.

As indicated above, in the preferred method of making our composition the calcium fluoride, or fluorspar, or some other halide, which is the necessary fluxing reagent during the exothermic reaction, is next added to the aluminum and iron oxide (preferably $Fe_3O_4$) mixture. The fluorspar, or fluxing halide, coats both the free or excess iron oxide and also the iron oxide surrounding the aluminum powder during the blending operations. Such intimate contact greatly improves the fluxing problem.

The calcined dolomite is critical to the successful use of our composition since it provides the uniform supply of the oxides of magnesium and calcium to the reacting components which is necessary for a good slag formation whereas the magnesite is utilized for initial reaction with such super heated slag to permit the formation of a homogenous basic refractory. Particle size distribution of both is controlled to minimize the porosity of the repair patch and to assist in the proper chemical reaction.

The optional silicon added to the patch material as a whole increases the acidity of the slag considered above. Such silicon also reacts exothermically to form silica and thus additionally contributes to the heat generated by the instant exothermic mix. A suitable high silicon alloy may be used instead of the metallic silicon, but as indicated above, if the patch material already contains more than 3% silica, such addition is unnecessary.

The present mixture ignites at about 2000° F., and following ignition the exothermic reaction proceeds to completion in stages through the repair material in accordance with the following chemical reaction:

$$8Al - 3Fe_3O_4 \rightarrow 4Al_2O_3 - 9Fe$$

to yield a homogenous repair patch. This reaction causes the formation of an unstable slag on the reacting interface of the mixture. The unstable slag thus formed is in a molten state and has been prefluxed by the CaF₂ in the mixture causing the immediate absorption unto itself of the entrained dolomite fines producing a low magnesium oxide unstable liquid slag having a temperature in excess of 3000° F., which liquid unstable slag immediately attacks the magnesite fines, and is thereupon transformed into a stable basic slag which coats and adheres to the magnesite grains, thereby effecting a basic to basic bond between the magnesite grains and the slag matrix. The composition then solidifies into a homogenous refractory mass which has an overall refractoriness in excess of the temperature requirements of an open-hearth furnace bottom, and consisting of partially diffused grain magnesite completely entrained in a matrix of dolomitic slag. The bonding slag thus formed by the unstable slag and the magnesite fines combined with the exothermic heat generated by the material, bonds the patch to the surrounding portion of the furnace bottom thus producing a homogenous patched area of the furnace bottom. Open-hearth usage, that is the application of steel making temperatures coupled with the pressure of the molten steel bath in the furnace, may further complete the diffusion process between the grains of magnesite and the matrix whereby both lose their identities, but this step only increases the already high refractoriness throughout and particularly at patch bottom interface and assists in producing suitable corrosion resistance. Such elevated temperature, i.e., greater than 2600° F. likewise causes a diffusion of $Fe_2O_3$ formed by re-oxidation of the minimiscule particles of metallic iron in the presence of super heated air through the repair patch to the patch-refractory wall boundary to result in a further increase in strength not only throughout the patch, but also at the patch-wall interface.

Referring to the process in somewhat greater detail, it should be understood that during the exothermic combustion process and particularly, during the reaction between the aluminum powder and the iron oxide considerable exothermic heat is generated in the area immediately between adjacent magnesite particles and that the temperature may range above 3000° F. Such heat permits the individual magnesite grains to react with the unstable slag to provide the bonding mechanism first between such grains on one hand, and it is such heat and resultant effects that permit the adherence of the repair patch to the surrounding furnace lining. Such aforesaid temperature of above 3000° F. occurs substantially only in the minute areas surrounding each magnesite grain rather than throughout the entire patch and that therefore the average temperature of the reacting patch may be only slightly above 2000° F.

It should further be understood that in the practice of the present invention the materials forming the exothermic mix are so selected as to not ignite until the mixture has been heated to a temperature of approximately 2000° F. It is critical that the exothermic reaction of the aluminum be restrained until the surroundings thereof reach about 2000° F. since the resultant slag will not wet the magnesite particles at temperatures much lower than this. By using the instant composition it is possible to prevent chain exothermic reactions from taking place instantaneously throughout the entire mass since the mass is heated to the critical temperature in depth stages and thus the exothermic action occurs only as its surrounding mass reaches the critical temperature from the heat generated in an adjoining mass area.

By the use of the foregoing composition it is possible to considerably reduce the time required in patching furnace linings not only because of the rapid setting but further because it may be used dry and requires no further preparation. In addition, such patching material is self-bonding and may be used to fill a hole of any depth and size without additional furnace firing to insure bonding.

Another desirable advantage of the use of our material is that it can be used after any heat has been tapped and the furnace "blown out" to repair inner cracks and small openings which may develop in the furnace bottom before such cracks or openings become of major concern and thus keep a furnace in operation by such maintenance for long periods of time whereas the usual practice is not to attempt repair of such small damage until greater damage results from furnace operations and then discontinue the furnace operations for a major repair job resulting in greater expense and longer periods of non-production for a furnace.

Not only can the instant composition be used to repair monolithic furnace linings, but it will be readily apparent to those skilled in this art that it can likewise be used to bond refractories, such as fire bricks and ram materials and in other applications where the magnesite bond may be highly advantageous and that the temperatures produced are never high enough to cause damage to any part of the furnace in which the mixture is being used.

It will be understood that variations and modifications may be effected without departing from the spirit or scope of the novel concepts of the instant invention.

What is claimed is:

1. A refractory composition consisting essentially of an intimate mixture of the following materials in finely divided particle size in percentages by weight:

| | Percent |
|---|---|
| Aluminum | 2–8 |
| Iron oxide | 2–8 |
| A halide flux forming material | 6–15 |
| Dolomite (calcined) | 0.5–3 |
| Magnesite (calcined) | 10–25 |
| | 50–80 |

2. The refractory composition as defined by claim 1 wherein up to 1% silicon is added.

3. An exothermic submixture for use in a refractory mix consisting of the following materials in fine particle form in percentages by weight:

| | Percent |
|---|---|
| Aluminum | 12 |
| Iron oxide | 33 |
| CaF₂ (fluorspar) | .5–5 |
| Dolomite | 50 |

4. The exothermic submixture as defined by claim 3 in which up to 3% powdered silicon is added.

5. An exothermic refractory material as follows:

| | Percent |
|---|---|
| Aluminum powder, −100 mesh | 2–8 |
| Iron oxide ($Fe_3O_4$, $Fe_2O_3$), −200 mesh | 6–15 |
| A halide flux producing material, −100 mesh | .5–3 |
| Dolomite (calcined of −20 mesh particle size with 60% particles of −100 mesh) | 15–60 |
| Magnesite (calcined), −10 mesh | 30–70 |

6. The exothermic mixture as defined in claim 5 to which 1% silicon is added.

7. An exothermic refractory material as follows:

| | Percent |
|---|---|
| Aluminum powder | 4.13 |
| Iron oxide ($Fe_3O_4$, $Fe_2O_3$) | 11.00 |
| Calcium fluoride | 1.67 |
| Dolomite (calcined) | 16.60 |
| Magnesite (calcined) | 66.60 |

8. An exothermic refractory material as follows:

| | Percent |
|---|---|
| Aluminum power | 4.13 |
| Iron oxide ($Fe_3O_4$, $Fe_2O_3$) | 11.00 |
| A flux producing halide | 1.67 |
| Dolomite (calcined) | 16.60 |
| Magnesite (calcined) | 66.60 |

9. An exothermic refractory material in finely divided particle size as follows:

| | Percent |
|---|---|
| Aluminum | 2.06 |
| Iron oxide | 5.50 |
| Calcium fluoride | .835 |
| Dolomite (calcined) | 58.30 |
| Magnesite (calcined) | 33.30 |

10. The method of making an exothermic refractory composition comprising the making of a submixture by the progressive blending first of powered aluminum and iron oxide in the approximate proportions of a 12% aluminum and 33% iron oxide until the aluminum particles are coated with iron oxide, blending a halide flux forming material in 3% proportion of the total submixture with the aluminum and iron oxide mixture, blending substantially an equal amount of calcined dolomite to form the complete submixture and thereafter blending magnesite in the mixture thus formed in quantity at least equal to the submixture and up to 80% of the complete refractory mixture.

11. The method of making an exothermic refractory composition which consists in progressively blending together a mixture of 4% powdered aluminum, 10% iron oxide in finely divided form, 2% calcium fluoride, 17% dolomite of —20 mesh screen size with at least 60% of the dolomite of a —100 mesh screen size, and 67% magnesite of —10 mesh screen size.

12. A method of making an exothermic refractory composition which consists in progressively blending together in approximate quantities by weight of 4.13 percent powdered aluminum, 11 percent iron oxide in finely divided form, 1.67 percent a halide flux producing material, and 16.60 percent calcined dolomite of —20 mesh screen size with at least 60 percent of the dolomite of a —100 mesh screen size and 66.60 percent calcined magnesite of a —10 mesh screen size and adding to the mixture thus formed an equal quantity of calcined dolomite of the screen sizes hereinbefore set forth.

References Cited in the file of this patent

UNITED STATES PATENTS

| 1,934,263 | Hacks et al. | Nov. 7, 1933 |
| 2,253,955 | Hebbe et al. | Aug. 26, 1941 |